C. R. SCHILLING.
GEARING.
APPLICATION FILED JAN. 4, 1912.

1,067,144.

Patented July 8, 1913.

2 SHEETS—SHEET 1.

Attest:
Wm. H. Scott.
Stella Hill.

Inventor:
Charles R. Schilling
by Bruer L. Emiott
atty

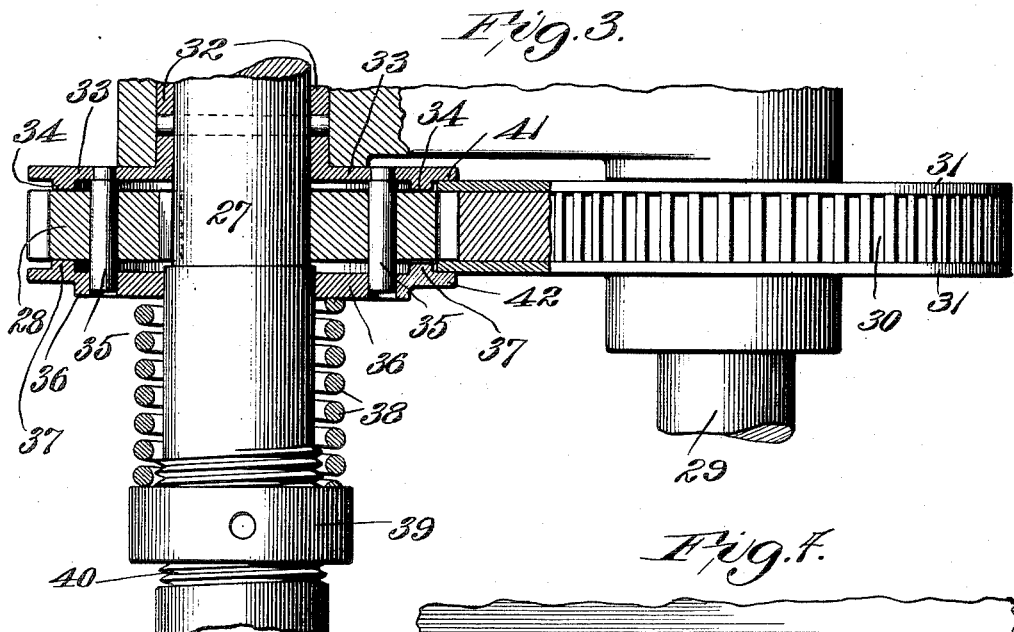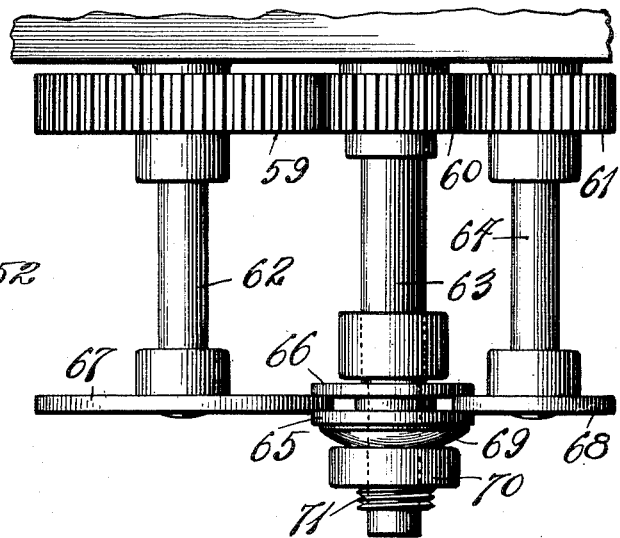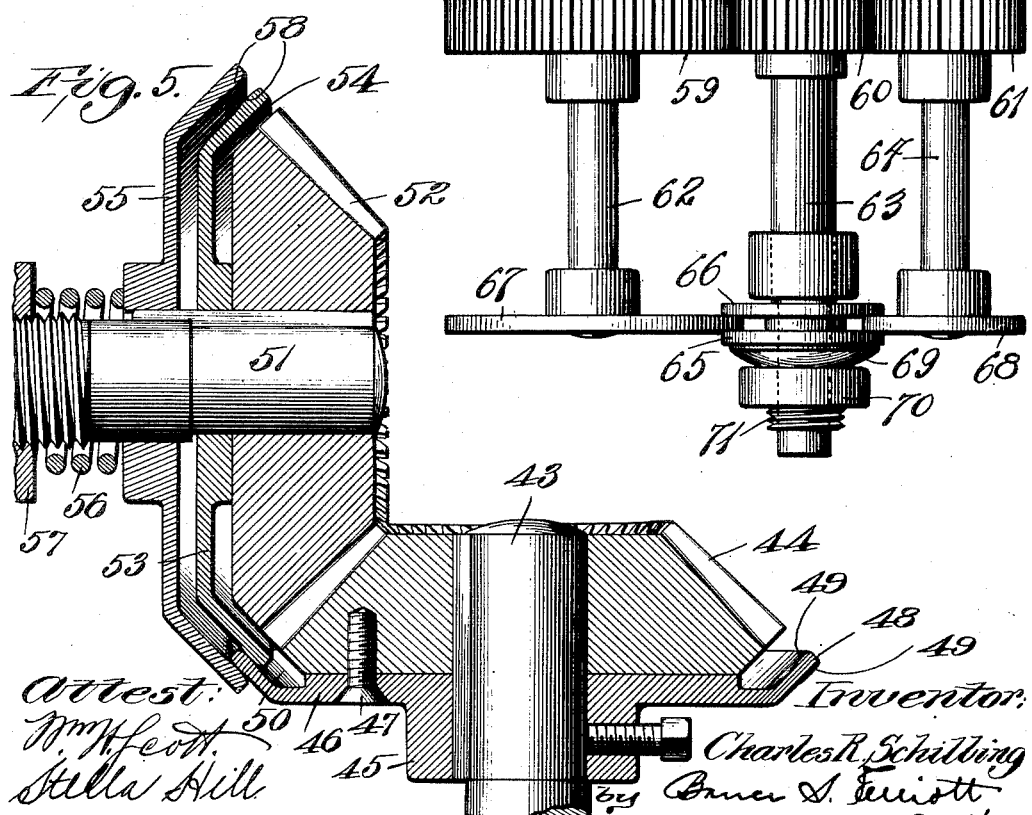

UNITED STATES PATENT OFFICE.

CHARLES R. SCHILLING, OF ST. LOUIS, MISSOURI.

GEARING.

1,067,144.  Specification of Letters Patent.  Patented July 8, 1913.

Application filed January 4, 1912. Serial No. 669,362.

*To all whom it may concern:*

Be it known that I, CHARLES R. SCHILLING, a citizen of the United States, residing in the city of St. Louis and State of Missouri, have invented new and useful Improvements in Gearing, of which the following is a specification.

This invention relates to means for preventing back lash and other independent movement in gears whereby to cause the gears to run silently and to decrease the wear thereof.

The invention may be stated to consist broadly of frictionally-engaging members movable with the shafts carrying the gears, the pressure of the frictional contact being such as not to interfere with the free movement of the gears about their axes, but sufficient to prevent independent movement of the gears relative to each other under conditions of change of load, or the like. The friction members may be directly attached to and carried by the gears themselves, which, for the sake of compactness of construction, I deem the more desirable arrangement in most cases; or they may be mounted independently of the gears on the shafts thereof. In the use of either form of my invention the gears are caused to run true at all times, and independent movement of the gears relative to each other, including back lash, is prevented. It follows that the wear of the teeth is greatly reduced, the life of the gears prolonged, and the gears caused to run in a substantially noiseless manner.

While I anticipate that the widest application of my invention will be found in connection with automobile gearing, the invention is not limited to any special application but may be employed in any relation where gears are used.

Figure 2:
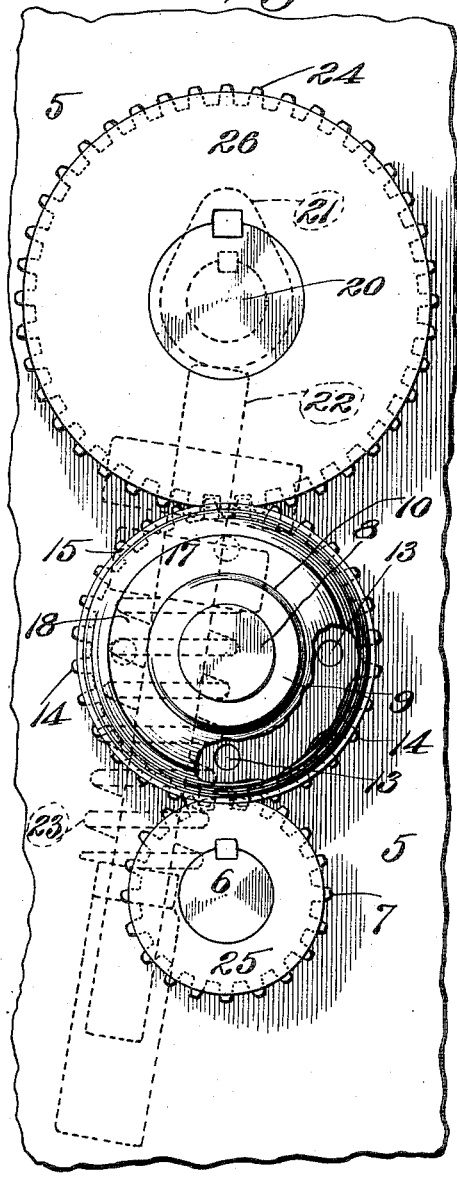
Figure 1:
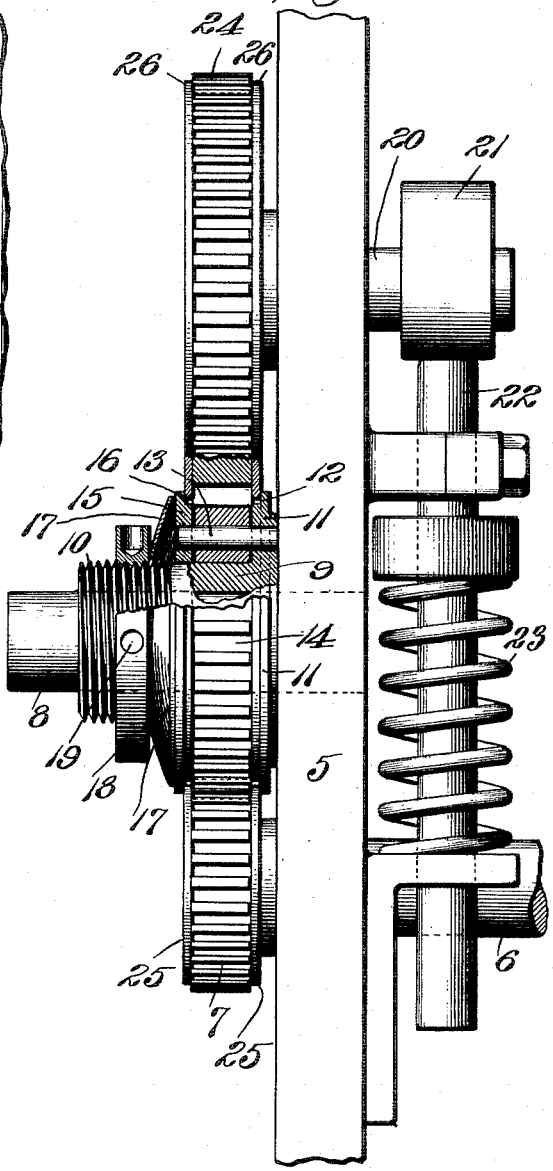

In the drawings illustrating the invention Figure 1 is a view partly in side elevation and partly in section showing my invention applied to a train of gears, such as may be used in connection with the operation of the valves of a combustion engine; Fig. 2 is a view in front elevation of the same, part of the construction being shown in dotted lines to better illustrate the operation; Fig. 3 is a plan view, partly in elevation and partly in section, showing the construction employed when but two intermeshing gears are employed; Fig. 4 is a plan view illustrating a modification, wherein the clamping members are shown mounted independently of the gears; and Fig. 5 is a horizontal sectional view illustrating the application of the invention to bevel gears.

Referring now to the drawings, 5 indicates a frame member in which is mounted a shaft 6 having secured on the end thereof a gear 7 which, in the present instance, is the driving gear. Mounted in the frame 5 is a stub shaft 8 on which is rotatably mounted a sleeve 9. The said sleeve 9 is provided at one end with a screw-threaded portion 10 and at its other end with an annular flange 11, from the periphery of which projects an annular shoulder 12, the inner face of which is preferably removed some distance from the inner face of the annular flange 11. The annular flange 11 has secured therein at four or more points around its inner face a series of dowel pins 13. Mounted on the sleeve 9 is a gear 14 which is apertured at four or more points to receive the dowel pins 13, and the inner face of which gear fits more or less snugly against the face of the annular projection 11.

The numeral 15 indicates a flat ring which is provided with an annular shoulder 16 and which is likewise apertured at four or more points to receive the ends of the dowel pins 13 which project beyond the outer face of the gear 14. Loosely mounted on the screw-threaded portion 10 of the sleeve 9 is a spring washer 17 which bears against the ring 15 and is braced thereagainst through the medium of a nut 18 having screw-threaded engagement with the portion 10 of the sleeve 9 and being provided with peripheral apertures 19 so that it may be turned by the use of a spanner wrench. Rotatably mounted in the frame 5 is a shaft 20 on which is mounted a cam 21 for operating a valve stem 22 controlled by a coiled spring 23. Fixedly secured on the end of the shaft 20 is a gear 24 which is in mesh with the gear 14, which, in turn, is in mesh with the gear 7. Secured on opposite sides of the gear 7 are circular plates 25 which are adapted to be engaged by and between the annular shoulders 12 and 16 of the annular flange 11 and ring 15. Secured also on opposite sides of the gear 24 are circular plates 26 which are likewise adapted to be engaged by and between the said shoulders 12 and 16. The plates 25 and 26, as shown in the drawing, do not extend to the outer edge of the teeth of the gears, but they may do so if desired, and preferably the periphery of these plates is out of engagement with the bottom of the recess formed by the shoulders 12 and 16 in the respective members 11 and 15.

The parts being assembled in the manner shown in Fig. 1, it will be obvious that by turning home the nut 18 against the spring washer 17 the annular shoulder 16 will be forced into frictional engagement with the outer circular plates 25 and 26 and the annular shoulder 12 will be correspondingly thrown into greater or less frictional contact with the inner plates 25 and 26. As the gear 7 is driven, turning the idler gear 14 and the gear 24, the annular shoulders 12 and 16 will frictionally engage the sides of the wear plates 25 and 26, and not only hold these gears to movement in a fixed plane but prevent all movement of the gears other than the movement about their axes. As an illustration, it will be apparent that as the working end of the cam 21 approaches the end of this valve stem 22 the resistance of the spring 23 will tend to retard the movement of the gear 24 and, as it were, forces it backward increasing the frictional contact on one side of its teeth and the teeth of the gear 14 and other gears in mesh therewith or with which the gear 24 may be in mesh. As soon as the working end of the cam 21 has passed beyond the end of the valve stem 22 the pressure of the spring acting on the opposite side of said cam then tends to advance the gear wheel 24, so to speak, and to increase the frictional contact between the other side of its teeth and those of the gear wheel 14, and with other gears that may be in train therewith. In fact, any change of load produces, or tends to produce, what is known as back lash, which movement, as is well-known, causes rapid wearing away of the teeth of the gears, so that the life of such gears is materially shortened and their frequent renewal rendered necessary, particularly in the case of the gears of an automobile engine. Now it will be seen that by clamping the gears between two rotary friction members, back or forward movement of the gears, beyond or in addition to their regular movement, will be resisted by the frictional contact of the members stated with the gears, or the wear plates thereof, and thus not only reduce the noise of running but likewise reduce the wear on the teeth.

In Fig. 3 I have shown the manner of employing my invention when only two gears are running in mesh. A shaft 27 has keyed thereon a gear wheel 28 and a shaft 29 has mounted thereon, either loosely or fixedly, a gear 30. The said gear 30 is provided on opposite sides, as in the previous construction, with wear plates 31. Secured on the shaft 27 is a sleeve 32 having an annular flange 33 which may be substantially of the diameter of the gear 28. Said flange is provided on its inner side at a point somewhat removed from its edge with an annular rib 34 which is adapted to bear against the side of the gear wheel 28 at a point below the base of its teeth. The annular flange 33 is provided with a series of dowel pins 35 projecting from its inner face, and the gear wheel 28 is provided with a corresponding number of apertures to receive these dowel pins which extend through and beyond the said gear. The numeral 36 indicates a friction ring which is loosely mounted on the shaft 27 and is apertured to receive the ends of the dowel pins 35. The ring 36 is provided on its inner side with an annular rib 37 which corresponds with the rib 34 of the annular flange 33. A spiral or other spring 38 may be caused to exert regulated pressure against the friction ring 36 by means of a nut 39 which has screw-threaded engagement with a screw-threaded part 40 of the shaft. The provision of the ribs 34 and 37 provides annular shoulders 41 and 42 which are adapted to engage the outer sides of the respective wear plates 31. In the present case the contact between the shoulders 41 and 42 and the two plates 31 is caused by the annular shoulder 42 bearing against the wear plate on one side of the gear and forcing the wear plate on the other side against the shoulder 41, the ordinary play or yield of the gear permitting this movement which is so infinitesimal as not to destroy the alinement of the gears, or in any manner to interfere with their proper working. The engagement of the shoulder 42 with the wear plate 31 will lift the annular rib 37 out of engagement with the side of the gear at one side thereof and force it into engagement therewith at the opposite side, as shown by the drawing in an exaggerated manner. As a matter of fact, the distortion of the paths is scarcely perceptible. The arrangement of Fig. 3 operates in the same manner as that shown in Fig. 1 to prevent movement of the gears relative to each other, and thereby diminish the noise and the wear of the gears.

In Fig. 5 is shown the application of the invention to bevel gears. 43 indicates a shaft on which is keyed a bevel gear 44. Keyed on the shaft is also a hub 45 from which projects an annular portion 46 which lies against the outer face of the gear 44 and is secured thereto as shown at 47. The annular portion 46 is provided with an annular flange member 48 which extends parallel to the outer ends of the teeth of the gear and is located at a distance therefrom, being slightly convexed on opposite sides near its outer edge, as shown at 49. This annular projection provides a space 50 between it and the outer ends of the teeth of the gear. 51 indicates a second shaft having keyed thereon a bevel gear 52 meshing with the gear 44 having also keyed thereon a saucer-shaped plate 53, the outer edge portion of which extends parallel to the outer ends of the teeth of the gear 52, but at a distance therefrom, providing a space 54. The numeral 55 indicates a second saucer-shaped plate which is keyed on the shaft 51 and is longitudinally movable thereon under the pressure of a spring 56 controlled by a nut 57. The opposing faces of the plates 53 and 55 are slightly convexed near the periphery of the plates, as indicated at 58, these convex portions being adapted to engage the convex portions 49 of the annular member 48. When assembled the annular flange member 48 passes into the space between the two saucer-shaped plates 54 and 55, and by adjusting the nut 57 the degree of frictional contact may be regulated, the respective plates turning in contact with each other, and the engagement holding the gears steady and preventing relative movement thereof, as in the constructions previously described.

While I have described the wear plates as being applied to the gears, it will be obvious that the gears could be constructed with such off-set portions as an integral part of their construction, and I wish it understood that such obvious modification would be within the scope of, and is intended to be embraced by, the following claims.

In the constructions above described the clamping members have been directly associated with the gears. In Fig. 4 I illustrate a modification in which the clamping members are mounted independently of the gears, on the shafts thereof. In this construction the numerals 59, 60 and 61 indicate a train of intermeshing gears, and the numerals 62, 63 and 64 their respective shafts. On the shaft 63 of the intermediate gear I mount two clamping rings 65 and 66, and on each of the shafts 62, 64 I mount a friction disk 67 and 68, the sides of which are frictionally embraced near their periphery by the clamping rings 65 and 66. A spring washer 69 and a jam-nut 70 engaging a screw-threaded portion 71 of the shaft 63 are employed in the same manner as shown in Fig. 1 to cause the rings 65 and 66 to clamp the friction disks 67 and 68 with greater or less pressure. The clamping rings 65 and 66 are preferably keyed on the shaft 63 to turn therewith, or, as will be understood, the clamping ring 66 may be fixedly secured to the shaft and the clamping ring 65 be keyed thereon. Such variations, however, are within the skill of the mechanic, and it is not considered necessary to illustrate them, the essential being that the clamping rings and the friction disks shall be so secured to their shafts that in operation they will rotate as a part thereof.

I claim:

1. The improvement in gearing comprising, in combination with a plurality of intermeshing gears, a rotatable member traveling with one of said gears, rotatable friction means traveling with an adjacent gear and frictionally engaging the said rotatable member, and means for regulating the pressure of such engagement without disturbing the relative position of the gears.

2. The improvement in gearing comprising, in combination with a plurality of intermeshing gears, a rotatable member traveling with one of said gears, and rotatable friction means traveling with an adjacent gear and frictionally and elastically engaging the said rotatable member.

3. The improvement in gearing comprising, in combination with a plurality of intermeshing gears, a rotatable member traveling with one of said gears and rotatable clamping means traveling with an adjacent gear and embracing and frictionally and elastically engaging the said rotatable member.

4. The improvement in gearing comprising, in combination with a plurality of intermeshing gears, means carried by one of said gears for frictionally and elastically engaging an adjacent gear.

5. The improvement in gearing comprising, in combination with a plurality of intermeshing gears, means carried by one of said gears for embracing and frictionally and elastically engaging an adjacent gear.

6. The improvement in gearing comprising, in combination with a plurality of intermeshing gears, means carried by one of said gears for frictionally engaging an adjacent gear, and means for regulating the pressure of such engagement.

7. The improvement in gearing comprising, in combination with a plurality of intermeshing gears, rotatable means carried by one of said gears for frictionally and elastically engaging an adjacent gear.

8. The improvement in gearing comprising, in combination with a plurality of intermeshing gears, means carried by and rotatable with one of said gears for frictionally and elastically engaging an adjacent gear.

9. The improvement in gearing comprising, in combination with a plurality of intermeshing gears, adjustable means carried by and rotatable with one of said gears for embracing and frictionally engaging an adjacent gear, and means for regulating the pressure of such engagement.

10. The improvement in gearing comprising, in combination with a plurality of intermeshing gears, adjustable means carried by and rotatable with one of said gears, and adapted to embrace and frictionally engage an adjacent gear, and means for regulating the pressure of such engagement.

11. The improvement in gearing, comprising, in combination with a plurality of intermeshing gears, a pair of circular clamping plates carried by and rotatable with one of said gears, and traveling in frictional relation with an adjacent gear.

12. The improvement in gearing comprising, in combination with a plurality of intermeshing gears, circular wear plates mounted on opposite sides of one of the gears, a pair of circular clamping plates carried by an adjacent gear, and embracing and frictionally engaging the outer side edge portion of said wear plates, and means for regulating the pressure of such engagement.

13. The improvement in gearing comprising, in combination with a plurality of intermeshing gears, a pair of circular clamping plates carried by one of said gears, an adjacent gear having circular off-set portions on opposite sides adapted to be embraced and frictionally engaged by said clamping plates at their lateral edge portions, and means for regulating the pressure of such engagement.

14. The improvement in gearing comprising, in combination with a plurality of intermeshing gears, circular wear plates provided on opposite sides of a number of said gears, a shaft, a screw-threaded sleeve rotatably mounted thereon, and having an annular flange provided with a circular shouldered portion adapted to engage the wear plates on corresponding sides of adjacent gears, a shouldered ring mounted on said sleeve and having a shoulder engaging the wear plates on the opposite sides of said adjacent gears, a spring washer bearing against said ring, and a nut mounted on the screw-threaded portion of said sleeve and adapted to be turned against said spring washer to force and yieldably hold the said shouldered portions in frictional engagement with the wear plates of said gears.

15. The improvement in gearing comprising, in combination with a plurality of intermeshing gears, off-set portions on one of said gears affording wearing surfaces, a pair of adjustable clamping plates carried by and rotatable with an adjacent gear and embracing and frictionally engaging said off-set portions, a member connected to one of said clamping plates and having a screw-threaded end projecting through and beyond the other, a nut engaging said screw-threaded portion, and a spring member interposed between said nut and the adjacent clamping plate whereby the clamping plates may be forced and yieldably held in contact with said off-set portions of an adjacent gear.

In testimony whereof, I have hereunto set my hand in presence of two subscribing witnesses.

CHARLES R. SCHILLING.

Witnesses:
 BRUCE S. ELLIOTT,
 STELLA HILL.